United States Patent
Chia

(10) Patent No.: US 7,457,699 B2
(45) Date of Patent: Nov. 25, 2008

(54) TECHNIQUE FOR DETECTING TRUCK TRAILER FOR STOP AND GO ADAPTIVE CRUISE CONTROL

(75) Inventor: Michael I. Chia, Cicero, IN (US)

(73) Assignee: Delphi Technologies, Inc., Troy, MI (US)

( * ) Notice: Subject to any disclaimer, the term of this patent is extended or adjusted under 35 U.S.C. 154(b) by 504 days.

(21) Appl. No.: 10/761,580

(22) Filed: Jan. 21, 2004

(65) Prior Publication Data

US 2005/0159875 A1    Jul. 21, 2005

(51) Int. Cl.
*B60T 7/12*    (2006.01)
*G06D 1/00*    (2006.01)
(52) U.S. Cl. ............................ 701/96; 701/97; 701/301
(58) Field of Classification Search .................... 701/96, 701/97, 301
See application file for complete search history.

(56) References Cited

U.S. PATENT DOCUMENTS

| | | | | | |
|---|---|---|---|---|---|
| 4,621,705 | A | * | 11/1986 | Etoh | 180/169 |
| 5,454,442 | A | * | 10/1995 | Labuhn et al. | 180/169 |
| 5,495,251 | A | * | 2/1996 | Gilling et al. | 342/70 |
| 5,749,426 | A | * | 5/1998 | Gilling | 180/167 |
| 6,009,368 | A | * | 12/1999 | Labuhn et al. | 701/96 |
| 6,044,321 | A | * | 3/2000 | Nakamura et al. | 701/96 |
| 6,147,600 | A | | 11/2000 | Faye | 340/467 |
| 6,430,494 | B1 | * | 8/2002 | Inoue et al. | 701/96 |
| 6,622,810 | B2 | * | 9/2003 | Labuhn et al. | 180/169 |
| 6,708,099 | B2 | * | 3/2004 | Tellis et al. | 701/96 |
| 6,810,319 | B2 | * | 10/2004 | Manaka | 701/96 |
| 2003/0154016 | A1 | * | 8/2003 | Manaka | 701/96 |

FOREIGN PATENT DOCUMENTS

| | | |
|---|---|---|
| DE | 4437678 | 5/1996 |
| EP | 0976627 | 2/2000 |
| WO | 2004005092 | 1/2004 |

OTHER PUBLICATIONS

European Search Report for 05075035.5.

* cited by examiner

*Primary Examiner*—Khoi H. Tran
*Assistant Examiner*—Brian J Broadhead
(74) *Attorney, Agent, or Firm*—Douglas D. Fekete

(57) ABSTRACT

A technique for providing better detection of close range truck trailers for a motor vehicle with Stop and Go Adaptive Cruise Control determines if a range parameter to a target requires modification if such target is a truck trailer, for example. Truck trailer geometry is such that a standard adaptive cruise control system may have difficulty accurately determining the range to the rearmost position of the truck. The technique determines an initial range from the motor vehicle to a target. Then, the technique determines whether the range rate of the target is above a predetermined rate. When the range rate of the target is not above the predetermined rate, the technique determines whether the initial range to the target is less than a current range to the target. If so, the technique provides an adjusted range, which is then utilized in the control operation of the motor vehicle.

11 Claims, 5 Drawing Sheets

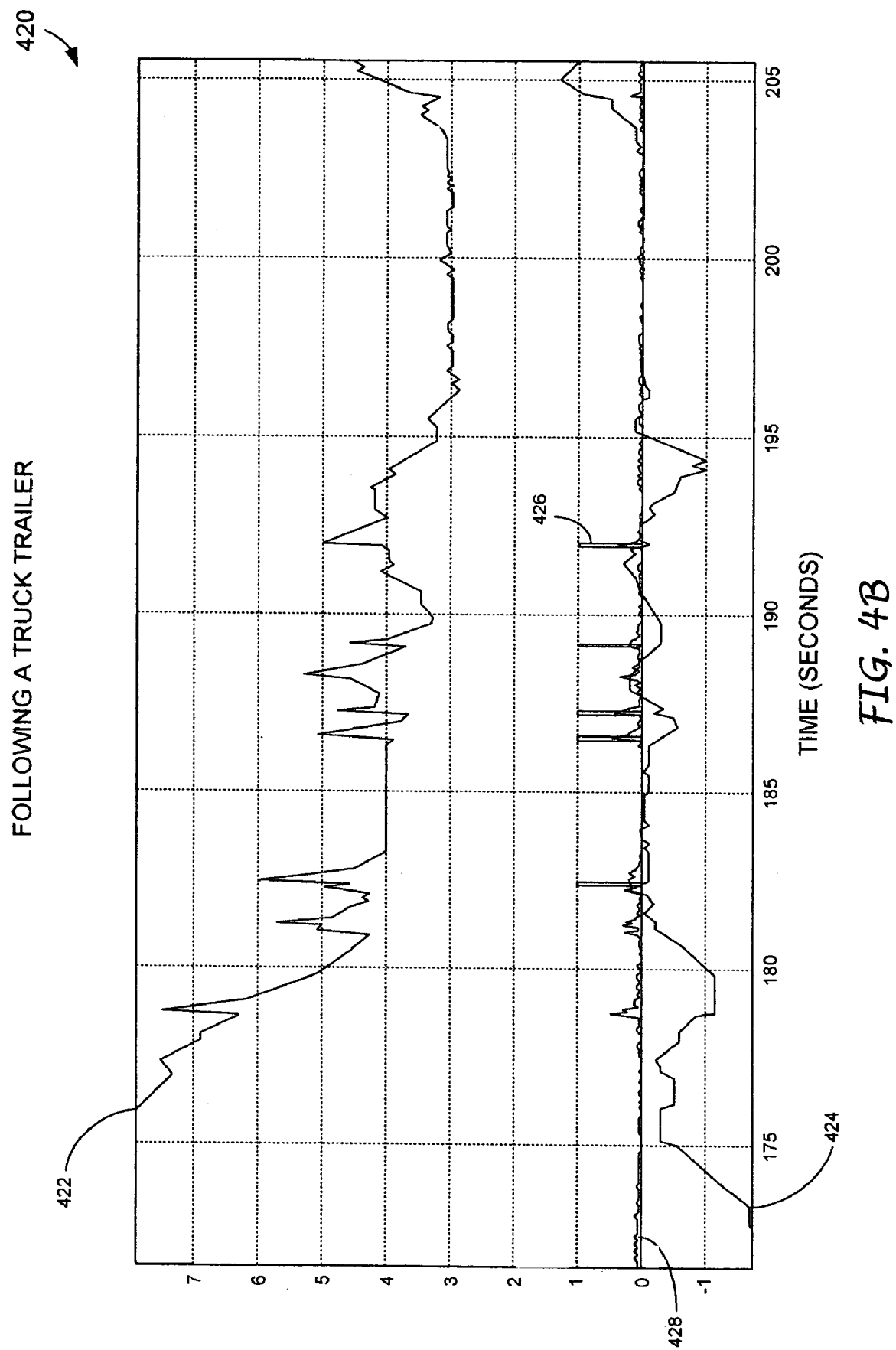

TECHNIQUE FOR DETECTING TRUCK TRAILER FOR STOP AND GO ADAPTIVE CRUISE CONTROL

TECHNICAL FIELD

The present invention is generally directed to detecting objects and, more specifically, to detecting a truck trailer using stop and go adaptive cruise control.

BACKGROUND OF THE INVENTION

Increasingly, motor vehicle manufacturers are installing safety devices in motor vehicles to enable drivers to drive in a safer, more efficient manner. For example, some manufacturers have included forward looking systems (FLSs), rear detection systems (RDSs) and side detection systems (SDSs) within certain vehicle models. An adaptive cruise control (ACC) system is one example of an FLS.

A typical ACC system uses a sensor (e.g., a radar or laser sensor), mounted at the front of a host motor vehicle, to detect objects in the forward path of the vehicle. When an object is detected, the ACC system typically compares the projected path of the vehicle to the object location such that objects on the roadside or in different lanes are eliminated. That is, if the lane ahead is clear, the ACC system maintains a set vehicle speed. However, when a slower motor vehicle is detected that is in the path of the host motor vehicle, the ACC system maintains a driver selected distance (using throttle control and/or limited braking) between the vehicles.

A typical ACC system uses a mechanically scanned radar sensor, which normally improves the ability of the system to detect targets (e.g., other vehicles) in heavy traffic. For example, one commercially available ACC system has a range of one-hundred-fifty meters, an azimuth coverage of fifteen degrees and updates approximately ten times per second. ACC systems generally determine the range of a detected object, as well as the relative speed of the detected object.

It should be appreciated that it is relatively important for an ACC system to accurately determine the range of various in-lane motor vehicles, such as truck trailers. Accurately detecting the range of in-lane motor vehicles is even more desirable in an ACC system that performs stop and go functions. As is well known, a stop and go ACC system provides motor vehicle control down to approximately zero speed, which allows the ACC system to be utilized in urban environments and during various traffic conditions, e.g., during traffic jams. It should also be appreciated that a stop and go ACC system requires operation at very low speeds and, thus, necessitates relatively accurate detection of leading motor vehicles at close range such that safe following and stopping distances can be maintained.

However, at close range, the range to a truck trailer can be difficult to accurately detect due to the configuration of the trailer. That is, truck trailers generally provide multiple radar reflections at close range, e.g., approximately 20 meters and under. Further, the sensor of the ACC system may track an axle of the trailer (instead of the rear of the trailer), as the sensor has a limited vertical field of view at close proximity to the rear of the trailer. A typical range differential between a rear of a truck trailer and a rear axle of the trailer is about 3.5 meters. In stop and go ACC systems, a significant collision risk occurs when a sensor is misreporting the true range by 3.5 meters, which can occur when the sensor reports the range to the rear axle of the trailer instead of the range to a rear of the trailer.

What is needed is a practical technique for an adaptive cruise control (ACC) system that allows the ACC system to safely operate at low speeds by accurately detecting a lead motor vehicle at close range so as to maintain a safe distance between the lead motor vehicle and a trailing motor vehicle in which the ACC system is installed.

SUMMARY OF THE INVENTION

The present invention is directed to a technique for providing close range detection, e.g., tractor trailer detection, for a motor vehicle. Initially, the technique is implemented by determining an initial range from a motor vehicle to a target, e.g., a tractor trailer. Then, the technique determines whether a range rate of the target is above a predetermined rate. For example, a range rate less than a threshold level of zero indicates that a host motor vehicle is closing in on a lead motor vehicle. When the range rate of the target is not above the predetermined rate, the technique determines whether the initial range to the target is less than a current range to the target. If so, the technique provides an adjusted range, which is then utilized to control operation of the motor vehicle.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which:

FIGS. 4A-4B are graphs depicting various range and range rate information associated with a stop and go ACC system installed within a motor vehicle.

DESCRIPTION OF THE PREFERRED EMBODIMENT(S)

Figure 1:
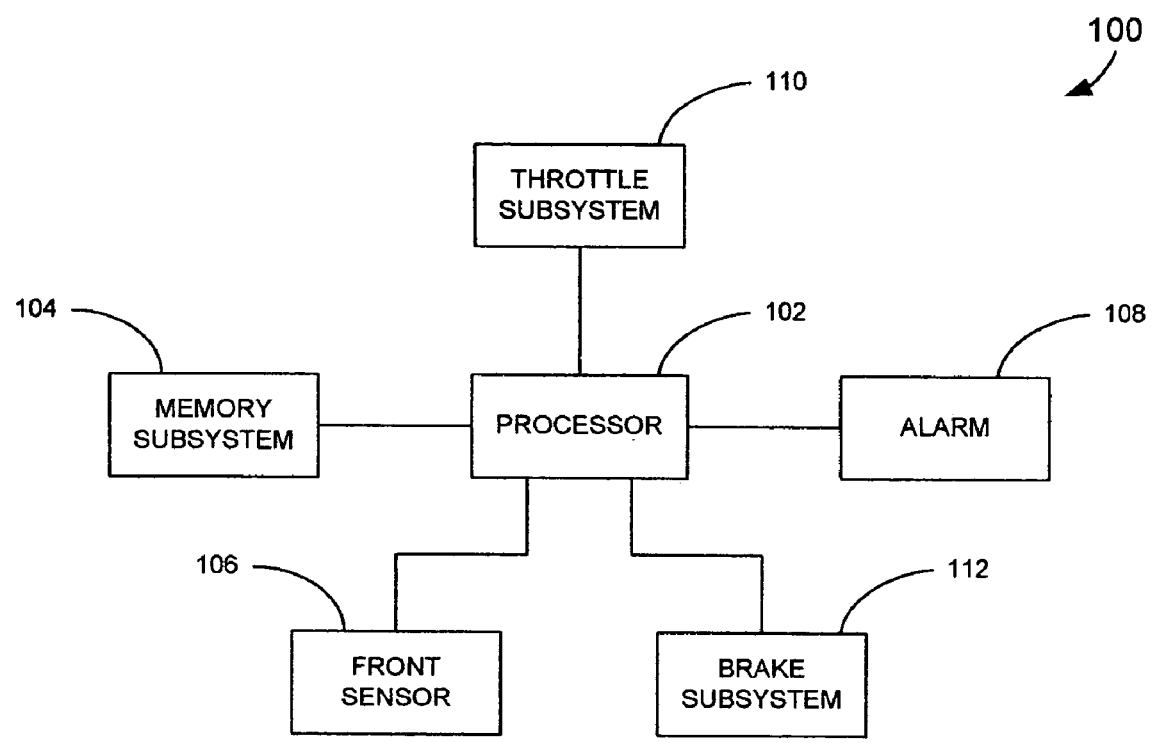
FIG. 1 is an electrical block diagram of an exemplary object sensing system, according to one embodiment of the present invention.

According to various embodiments of the present invention, a technique is described herein that provides for close range object detection, e.g., truck detection, for a motor vehicle. As is disclosed above, it is relatively important for a stop and go adaptive cruise control (ACC) system to be able to maintain a safe distance between an associated motor vehicle and a lead motor vehicle, when the vehicles are in relatively close proximity. According to the present invention, an ACC system initially determines an initial range from the motor vehicle to a target, such as a leading truck trailer. Next, the system determines whether a range rate of the target is above a predetermined rate.

When the range rate to the target is not above the predetermined rate, the system determines whether the initial range to the target is less than a current range to the target. When the initial range to the target is less than the current range, the system provides an adjusted range that is utilized to control operation of the motor vehicle. The system adds a predetermined offset to the adjusted range when the range rate is above a predetermined target rate.

Looking at it another way, when a range rate to a valid lead vehicle is below a predetermined rate, the system compares a currently measured range to a previously measured range (effectively differentiating the range signal and making an instantaneous range rate calculation). This calculated range rate is compared with a measured range rate. If a significant deviation exists such that the calculated range rate yields a positive value and the measured range rate is a negative value, a range/range rate inconsistency is indicated and the system decides that a potential truck trailer has been detected.

In general, the present invention takes advantage of the fact that a radar return signal or centroid has the tendency to 'slide' along a detected object that is of longitudinal orientation, such as the rear underside of a truck trailer. According to the present invention, when the range/range rate inconsistency occurs a flag is set to indicate to the vehicle control algorithm that a potential truck trailer has been detected and, accordingly, an adjusted range is provided that is utilized to control the operation of the motor vehicle. For example, the system may subtract a predetermined offset from a current range to provide the adjusted range. In this case, the system adds the predetermined offset back to the adjusted range when the range rate is above a predetermined target rate.

In an exemplary ACC system, the predetermined offset may be set to about 5 meters, the predetermined target rate may be about 0.5 meters per second and the predetermined range rate may be about 0.0 meters per second. According to one embodiment, the predetermined offset is only subtracted from the current range when the current range is less than about 20 meters. An ACC system constructed according to the present invention may also provide an alarm such that a driver of the motor vehicle can take an appropriate action when the adjusted range is less than a desired minimum distance. The operation of the motor vehicle may be controlled by initiating deceleration by a throttle system of the motor vehicle and/or initiating braking by the brake system of the motor vehicle.

FIG. 1 illustrates an exemplary block diagram of an object sensing system 100, according to one embodiment of the present invention. The object sensing system 100 includes a processor 102 coupled to a memory subsystem 104, a front sensor 106, an alarm 108, a throttle subsystem 110 and a brake subsystem 112. The memory subsystem 104 generally includes an application appropriate amount of volatile memory (e.g., dynamic random access memory (DRAM)) and non-volatile memory (e.g., flash memory, electrically erasable programmable read only memory (EEPROM)). In one embodiment, processor executable code, for providing close range truck detection for a motor vehicle, is stored within the non-volatile memory of the memory subsystem 104 of the object sensing system 100.

The processor 102 provides control signals to and receives data from the sensor 106. In response to the data from the sensor 106, the processor 102 may provide control signals to the throttle subsystem 110 and/or the brake subsystem 112. In addition, the processor 102 may provide control signals to the alarm 108 causing it to provide visual and/or audible feedback to a driver of an associated motor vehicle.

In one embodiment, the sensor 106, of the sensing system 100, includes a radar sensor that is mounted at the front of the motor vehicle. In a typical embodiment, the sensor 106 has a maximum range of about one-hundred fifty meters. The radar sensor may implement a frequency modulated continuous wave (FMCW) signal of about 76 GHz. A number of suitable radar sensors are manufactured and made commercially available by Delphi Delco Electronics of Kokomo, Ind. When a linear frequency modulation technique is implemented, the range to a detected object is normally ascertained by determining a frequency differential between a transmitted sensor scan signal and an associated received return signal. When the sensor scan signal is pulsed, the processor 102 normally examines the output of the sensor 106 in a plurality of windows, with each window corresponding to a particular time delay (i.e., range). Each window includes either a digital '0' or a digital '1', depending upon whether a reflection was received by the sensor 106 during a time period that corresponds to a particular window. In this manner, the processor 102 may determine the distance to a sensed object.

In one embodiment, the object sensing system 100 provides both qualitative audible and visual warnings to a driver of the vehicle. The alarm 108 can represent a visual indicator, an audible indicator, or both. For example, a plurality of light emitting diodes (LEDs) can be included within the alarm 108. An exemplary visual indicator includes LEDs that indicate the distance to an object—when all of the LEDs are lit, the object is at the closest point to the front of the vehicle.

Figure 2A:
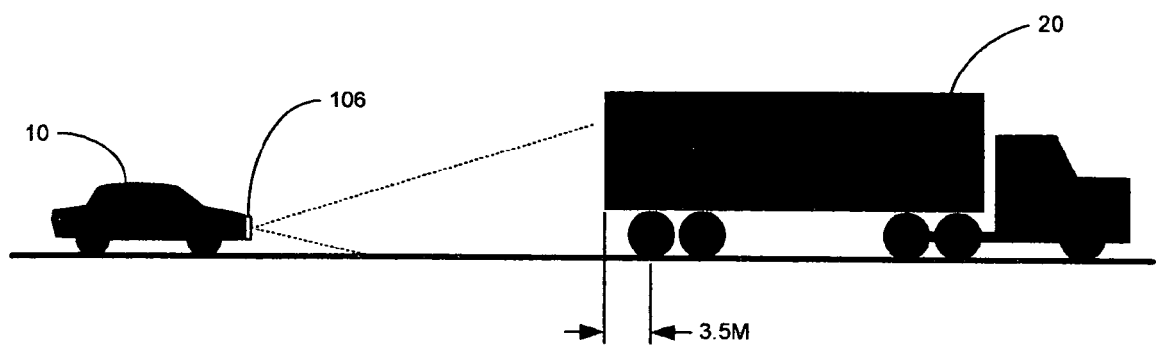
FIG. 2A is a diagram depicting a lead motor vehicle and a trailing motor vehicle with a relatively long distance between the vehicles.
Figure 2B:
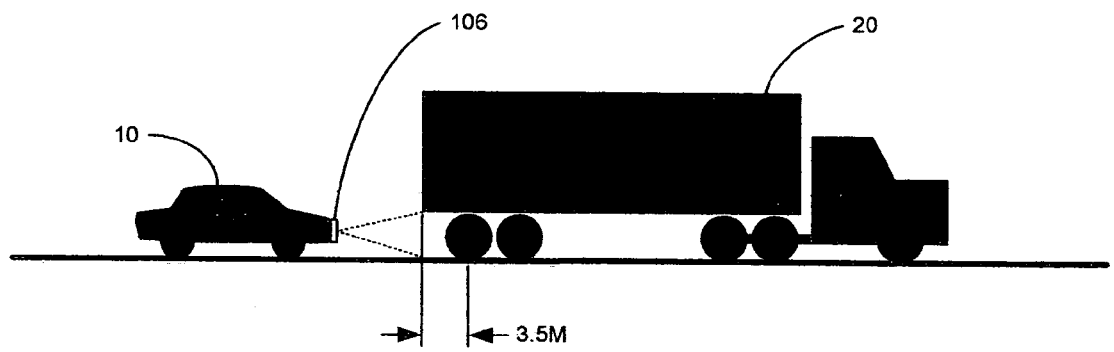
FIG. 2B is a diagram depicting the lead motor vehicle and the trailing motor vehicle with a relatively short distance between the vehicles.

FIGS. 2A and 2B depict a trailing motor vehicle 10 and a leading tractor trailer 20 at a relatively long range (i.e., a distance greater than 20 meters) and a relatively close range (i.e., a distance less than 20 meters), respectively. As is shown in FIG. 2A, the sensor 106 emits radar scan signals that are reflected from a back of the tractor trailer 20. However, as is shown in FIG. 2B, the scan signals provided by the sensor 106 at close range, may, due to the vertical limitations on the sensor 106, indicate the distance to the rear axle of the tractor trailer 20, which can be about 3.5 meters more than the distance to the back of the tractor trailer 20. It should be appreciated that a reported distance may fluctuate between reporting the distance to the back of the trailer and the distance to the rear axle of the trailer. Thus, in a vehicle that implements a stop and go adaptive cruise control (ACC) system, it is possible that the motor vehicle 10 may collide with a back of the tractor trailer 20 before the ACC system located within the motor vehicle 10 takes action to prevent the collision, due to improper reporting of the distance to the tractor trailer 20.

Figure 3:
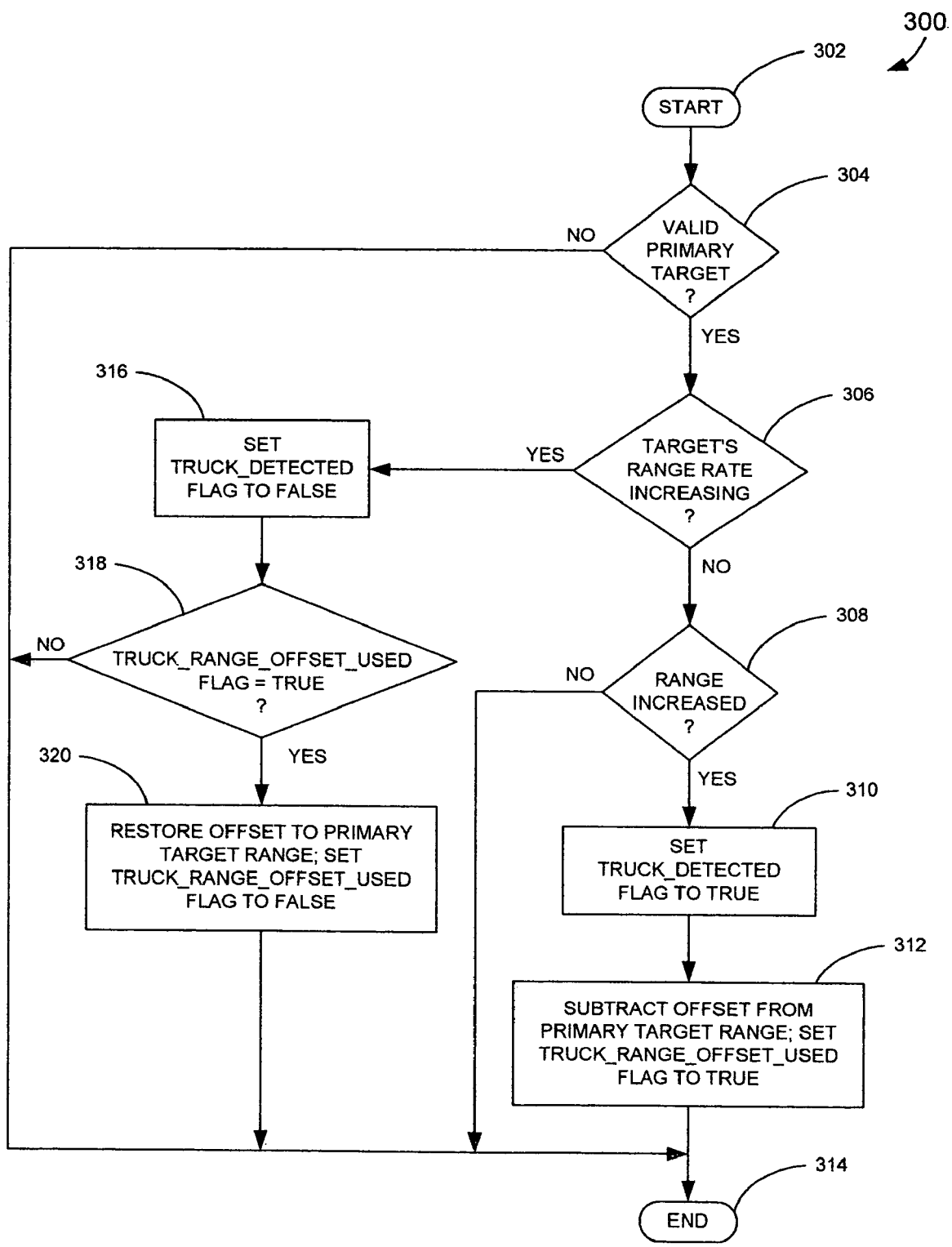
FIG. 3 is a flow diagram of an exemplary routine for providing close range truck detection for a stop and go adaptive cruise control (ACC) system.

FIG. 3 depicts a routine 300 that is utilized for close range truck detection for a stop and go ACC system. The routine 300 is initiated in step 302, at which point control transfers to decision step 304. In step 304, the routine 300, which is executed by processor 102, determines whether a valid primary target (i.e., an in-path lead motor vehicle) is detected by the system 100. The system 100 may detect a valid primary target in a number of ways. For example, the system 100 may consider a detected object as a valid in-path object when it meets the criteria of Delphi's ACC path prediction algorithm. This algorithm considers host vehicle state parameters such as vehicle speed and yaw rate, as well as properties of the detected object such as range, range rate and lateral position to determine if the detected object is a valid primary target. If the algorithm indicates the detected object is in a path of the host vehicle, the object is considered an in-path object. If the object is the closest in-path object, it is flagged as the primary in-path object and considered a valid primary target and the ACC system 100 controls vehicle throttle and braking based upon the target.

If a detected object is a valid target, control transfers from step 304 to decision step 306. In step 306, the processor 102 determines whether a range rate of the target is increasing, e.g., at a rate greater than 0.5 meters per second sampled every 100 milliseconds. If so, control transfers from step 306 to step 316, where the processor 102 sets a truck_detected flag to false to indicate that the object in front of the motor vehicle is pulling away.

If the range rate to the target is not increasing, e.g., the range rate is negative, in step 306, control transfers to decision step 308, where the processor 102 determines whether the range to the target is increasing. The routine 300 may examine a number of factors to determine whether the range to the target is increasing when the range rate is negative. For example, the routine 300 may determine: whether a current range to a target is less than 20 meters; whether a range rate of the target is less than 0.0 meters per second; if a current range to the target minus a previous range to the target is greater than 0.5 meters; and if the previous range is valid (e.g., the previous range is greater than 0.1 meters). If the range is increasing in step 308, control transfers from step 308 to step 310, where the processor 102 sets a truck_detected flag to true before passing control to step 312. Otherwise, control transfers from step 308 to step 314.

In step 312, the processor 102 subtracts a predetermined offset, e.g., a 5 meter offset, from a primary target range and sets the truck_range_offset_used flag to true before terminating the routine 300 in step 314. It should be appreciated that the primary target range may be reduced by ways other than subtraction. For example, the primary target range may be reduced by multiplying the primary target range by a number less than one or using a nonlinear look up table.

When the truck_detected flag is set to false in step 316, the processor 102 then determines whether the truck_range_offset_used flag is true in step 318. If the truck_range_offset_used flag is true, control transfers to step 320. Otherwise, control transfers to step 314, where the routine 300 terminates. In step 320, the processor 102 restores the predetermined offset, e.g., a 5 meter offset that was used in step 312, to the primary target range and sets the truck_range_offset_used flag to false, before transferring control to step 314. The routine 300 may repeat approximately every 100 mS while the motor vehicle 10 is in operation.

In general, a routine for implementing the present invention attempts to identify truck targets where a range to the truck is unstable, when a host motor vehicle is following or stopping relatively close, e.g., within 20 meters, behind a truck trailer. It should be appreciated that range jumps may be attributable to radar reflections from various surfaces on a back of and under, e.g., a rear axle, the truck trailer. Upon detecting a valid range jump, the routine sets a flag to indicate that a reported distance is erroneous, when the reported distance is less than a threshold distance. The condition is indicated when the range increases suddenly (and correspondingly the calculated differentiated range rate is positive) and the range rate (provided by the radar sensor) continues as a stable negative value.

For example, when the target range is less than 20 meters and the range increases by 0.5 meters or more, as the host motor vehicle closes on the lead truck trailer, the flag is set. The flag is cleared when the target pulls away from the host motor vehicle with a range rate greater than 0.5 meters per second. When the flag is set, the stop and go ACC system of the host motor vehicle responds with the knowledge that the target is closer than reported. Exemplary code for implementing this embodiment of the present invention is set forth below:

```
/*----------------+
| INCLUDES |
------------------*/
/* Algorithm Compiler Defs */
#include "rcp_defs.h"
/*---------------+
| GLOBALS |
----------------*/
/* Externals */
#include "rflr.h"
#include "rcp_sys.h"
/************************************************************
ROUTINE: FlagDetectRangeInconsistency
```

DESCRIPTION

This module sets a flag in the event of a host vehicle following closely behind a truck whereby a range can behave discontinuously as a centroid of a radar return signal does not firmly lock to any one portion on the back and/or under the truck during approach. A flag is used as the host closes in on the truck so that radar does not overestimate the range to truck. The condition can be identified when the range takes a sudden increase while the range rate continues to be a stable negative value as the range rate stays negative. This is a physical contradiction so such a condition will likely indicate the presence of a roadway vehicle that the host vehicle should approach cautiously, whether a truck trailer or similar vehicle. When the target range is less than 20 m and the range increases by 0.5 m or more per cycle, the flag f_truck_detected is set. The flag is cleared when the truck accelerates away with a range rate greater than 0.5 m/s. While the flag is set, the vehicle takes appropriate action being aware that the truck is physically closer than reported by the radar.

```
/************************************************************/
void FlagDetectRangeInconsistency (char target_id)
{
  float current_range, prev_range;
  float current_rrate;
  unsigned char tgt_status;
  FLR_TRK *p_trk; /* structure for radar track data */
  if ((target_id > 0 ) && (target_id < = MAX_FLR_TRKS))
  {
    /* Target is valid so get pointer to pick up range, range rate and
    status values */
    p_trk = &flr_trk[target_id-1]; /* global flr_trk */
    current_rrate = p_trk->range_rate;
    current_range = p_trk->range;
    tgt_status = p_trk->status;
    /* Reset truck_detected flag when target accelerates away or
    switches to new target */
    if (current_rrate > 0.5)
    {
      p_trk->f_truck_detected = FALSE;
    }
    if((current_rrate< =0.5)&&(p_trk->status>NEW_TGT))
    {
      /* If target is new or mature and not moving away from host,
         determine if range discontinuity is present */
      prev_range = p_trk->range_buf[1];
      if ((current_range < 20) && ((current_range – prev_range)
        >0.5)&&(prev_range>0.1)&&(current_rrate<-0.2))
      {
          p_trk->f_truck_detected = TRUE;
      }
    }
  }
} /* end FlagDetectRangeInconsistency */
```

From review of the code above, it should be appreciated that the module sets a flag in the event a host motor vehicle is following closely behind a target, e.g., a truck trailer, where the range can behave discontinuously as the centroid of the radar signal does not firmly lock to any one portion on the back and/or under the target. The flag is used to prevent the radar from over-estimating the range from the host motor vehicle to the target, and this condition can be identified when the range suddenly increases while the range rate continues to be a stable negative value as the host motor vehicle closes in on the target. This occurrence is physically contradicting and can be readily identified when the target range is less than about 20 meters and the range increases by about 0.5 meters or more while the host motor vehicle is closing in on the target. As disclosed above, the flag is cleared when the target pulls away with a range rate greater than about 0.5 meters/second. When the flag is set, the host motor vehicle is controlled to take an appropriate action with the knowledge that the host motor vehicle is closer to the target than indicated.

Figure 4A:
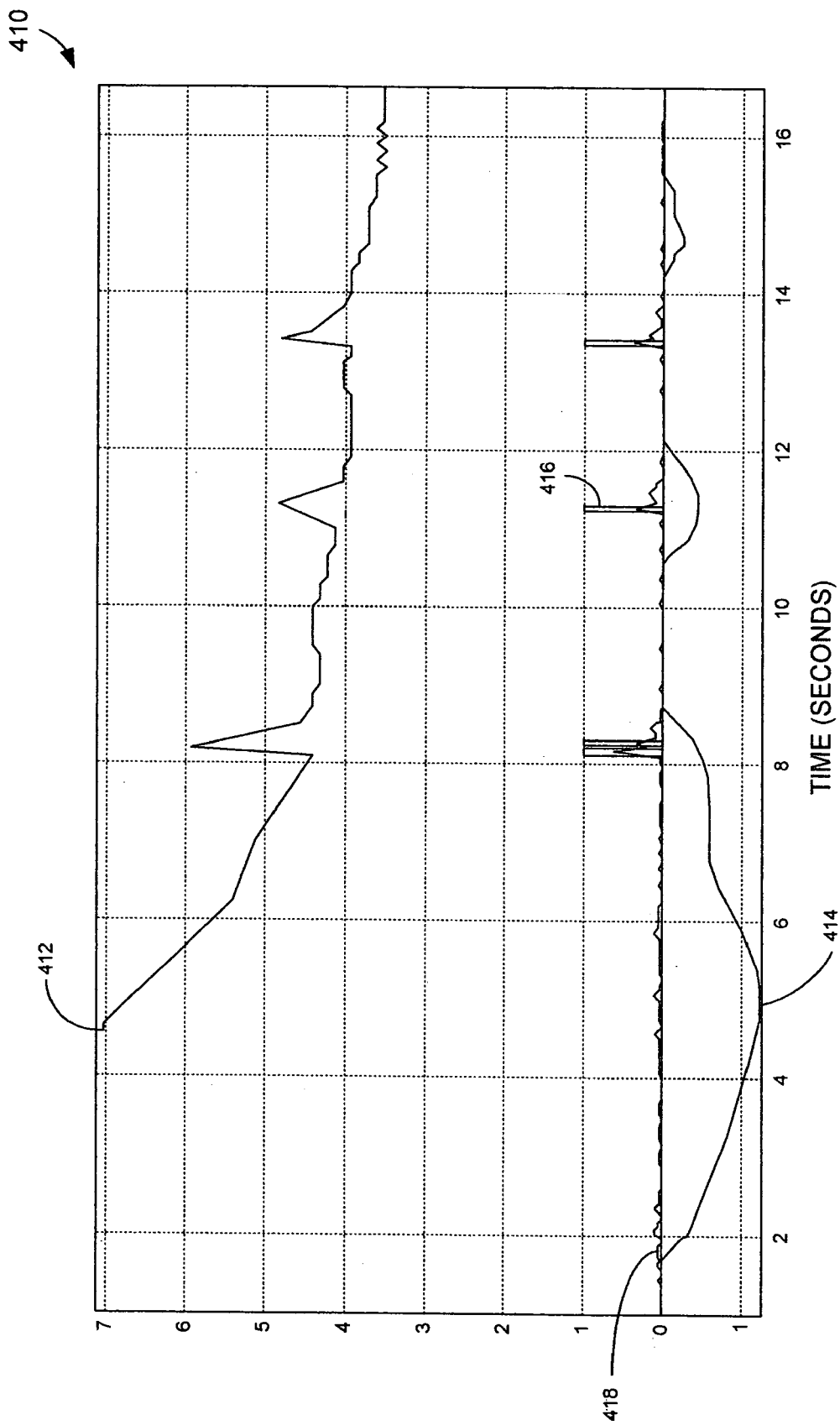

FIG. 4A depicts an exemplary graph 410 illustrating a range signal 412, a range rate signal 414, truck flags 416 and a delta range signal 418 as seen by a host motor vehicle that is approaching a stopped truck trailer. The truck flags 416, which range between a digital one and a digital zero, provide an indication that a lead truck has been detected. As is discussed above, when the truck flag signal is high, a range offset modification is implemented. FIG. 4B depicts yet another exemplary graph 420 illustrating a range signal 422, a range rate signal 424, truck flags 426 and a delta range signal 428 as seen by a host motor vehicle that is following a truck trailer. As above, the truck flags 426 provide an indication that a lead truck has been detected and when the truck flag signal is high a range offset modification is implemented.

Accordingly, a technique has been described herein that allows a stop and go ACC system to provide close range truck detection for a motor vehicle in a safer manner than currently provided by commercially available stop and go ACC systems.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

The invention claimed is:

1. A method for providing close range detection of rear surfaces of a truck characterized by a primary reflective surface defined by a truck body component and a secondary reflective surface defined by an undercarriage of said truck offset forwardly of said primary reflective surface by a predetermined dimension, said method comprising the steps of:
   periodically measuring range from a trailing motor vehicle to a rear surface of a target truck;
   periodically measuring a range rate between the motor vehicle and the target truck;
   determining when the sensed range between successive measurements reflects an increase in spacing between the motor vehicle and target truck and, simultaneously, the sensed range rate between said successive measurements reflects continued closure between the motor vehicle and target truck; and
   adjusting the most recently measured range value by adding a range adjustment factor substantially equaling the predetermined offset: wherein the adjusted range is utilized to control operation of the motor vehicle.

2. A method for providing close range truck detection for a motor vehicle, comprising the steps of:
   measuring an initial range from a motor vehicle to a target located in front of said motor vehicle;
   measuring a range rate between the motor vehicle and the target;
   subsequently measuring a current range from the motor vehicle to the target;
   determining whether the difference between the initial range to the target and the current range to the target indicate an apparent increase in the distance between the motor vehicle and the target, while the range rate indicates that the distance between the motor vehicle and the target is decreasing; and
   providing a downwardly stepped range adjustment when the initial range to the target and the current range to the target indicate an apparent increase in the distance between the motor vehicle and the target, while the range rate indicates that the distance between the motor vehicle and the target is decreasing, wherein the adjusted range is utilized to control operation of the motor vehicle.

3. The method of claim 2, in which the downwardly stepped range adjustment is about 5 meters.

4. The method of claim 2, wherein the downwardly stepped range adjustment is only made when the current range is less than about 20 meters.

5. The method of claim 2, wherein the operation of the motor vehicle is controlled by initiating deceleration by a throttle subsystem of the motor vehicle.

6. The method of claim 5, wherein the operation of the motor vehicle is also controlled by initiating braking by a brake subsystem of the motor vehicle.

7. An automotive system for providing close range truck detection for a motor vehicle comprising:
   a process;
   a range sensor coupled to the processor; and
   a memory subsystem coupled to the processor, the memory subsystem storing code that when executed by the processor instructs the processor to perform the steps of:
   measuring an initial range from a motor vehicle to a target located in front of said motor vehicle;
   measuring a range rate between the motor vehicle and the target;
   subsequently measuring a current range from the motor vehicle to the target;
   determining whether the difference between the initial range to the target and the current range to the target indicate an apparent increase in the distance between the motor vehicle and the target, while the range rate indicates that the distance between the motor vehicle and the target is decreasing; and
   providing a downwardly stepped range adjustment when the difference between the initial range to the target and the current range to the target indicate an apparent increase in the distance between the motor vehicle and the target, while the range rate indicates that the distance between the motor vehicle and the target is decreasing, wherein the adjusted range is utilized to control operation of the motor vehicle.

8. The automotive system of claim 7, in which the downwardly stepped range adjustment is about 5 meters.

9. The automotive system of claim 7, wherein the downwardly stepped range adjustment is only made when the current range is less than about 20 meters.

10. The automotive system of claim 7, wherein the operation of the motor vehicle is controlled by initiating deceleration by a throttle subsystem of the motor vehicle.

11. The automotive system of claim 10, wherein the operation of the motor vehicle is also controlled by initiating braking by a brake subsystem of the motor vehicle.

* * * * *